H. C. GREEN.
Churn.

No. 197,120. Patented Nov. 13, 1877.

WITNESSES
E. H. Bates
George E. Upham

INVENTOR
Henry C. Green
Gilmore Smith & Co
ATTORNEYS.

UNITED STATES PATENT OFFICE.

HENRY C. GREEN, OF CHICAGO, ILLINOIS.

IMPROVEMENT IN CHURNS.

Specification forming part of Letters Patent No. 197,120, dated November 13, 1877; application filed October 13, 1877.

*To all whom it may concern:*

Be it known that I, HENRY C. GREEN, of Chicago, in the county of Cook and State of Illinois, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1:
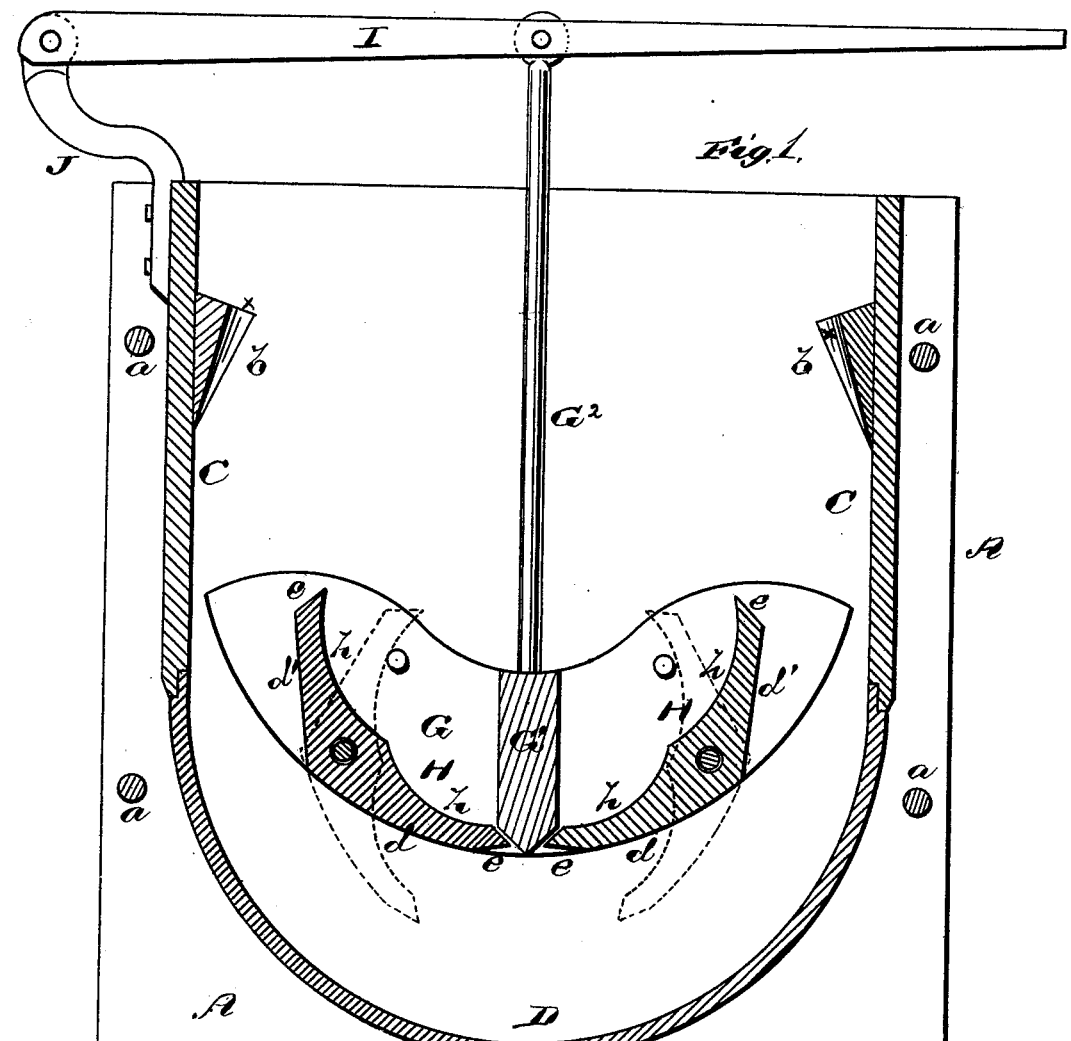
Figure 2:
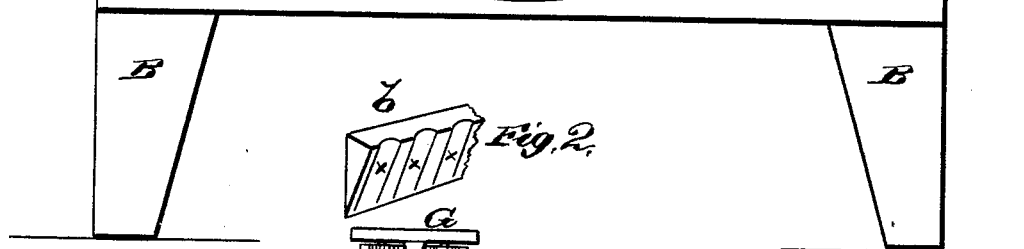
Figure 3:

Figure 1 of the drawings is a representation of a transverse vertical section of my churn, and Figs. 2 and 3 are details thereof.

The nature of my invention consists in the construction and arrangement of a churn, as will be hereinafter more fully set forth.

The annexed drawings, to which reference is made, fully illustrate my invention.

The body of my churn is composed of two end pieces, A A, provided with legs B B, and having inside grooves to receive the sides C C, and curved or circular bottom D, which are held in place by means of rods $a\ a$, passing through the end pieces A A on the outside of the sides, and to be drawn up by nuts on the ends of said rods, thus securing the ends and bottom in place without nails. If the bottom should shrink the end pieces can be drawn inward and the sides driven down to tighten it.

On the inside of the sides C C are secured wedge-shaped bars $b\ b$, which are formed on their inner inclined sides with a series of flutes or corrugations, $x$, to break the cream into jets and throw it into the center with the downward motion of the brake or dasher.

The dasher is constructed of two segmental end pieces, G G, connected by a center-bar, $G^1$, in the center of which the handle or rod $G^2$ is fastened.

Between the ends G G, on each side of the center bar $G^1$, is a float, H, hung loosely on pivots, as shown.

The outer side of each float H has its lower portion made convex, as shown at $d$, to fit the bottom of the churn, so as to work the cream thoroughly to the bottom. The upper portion of the float is beveled, as seen at $d'$, to facilitate the opening of the float, so that the cream can drop back to the bottom of the churn and allow the dasher to rise up with ease.

Both the top and bottom edges of the float are beveled, as shown at $e\ e$, for the purpose of opening the float with the upward motion of the lever, or to close them with the downward motion.

The inner side of each float is formed with two horizontal corrugations or double concaves, $h\ h$, for the purpose of carrying air down into the cream to air it out more thoroughly, as the air has to escape up through the cream that is broken into jets by means of the fluted bars $b\ b$.

The dasher thus constructed is connected to a lever, I, which is pivoted at one end to the upper end of an arm or standard, J, secured to one side of the churn-body.

The dasher can be easily removed when required for cleaning or other purposes.

By working the lever I up and down, the dasher is also worked up and down, the floats alternately opening and closing, so as to thoroughly break up the cream, and, by their peculiar construction, rapidly collecting the butter.

What I claim as new, and desire to secure by Letters Patent, is—

1. In a churn-dasher, the horizontally-pivoted floats H H, formed on their inner sides with the double concaves $h\ h$, on their outer sides with the convex surfaces $d$ and beveled surfaces $d'$, and their top and bottom edges $e\ e$ beveled.

2. The combination of a churn-body provided with interior fluted bars $b$, a dasher composed of the connected end pieces G G and pivoted floats H H, the rod $G^2$, and lever I, all constructed substantially as and for the purposes set forth.

In testimony that I claim the above I have hereunto subscribed my name in the presence of two witnesses.

HENRY CLAY GREEN.

Witnesses:
N. S. CLARK,
C. H. McEWEN.